United States Patent [19]

Lystad

[11] Patent Number: 4,475,263
[45] Date of Patent: Oct. 9, 1984

[54] WINDSHIELD WIPER SYSTEM

[75] Inventor: Leonard A. Lystad, Warren, Mich.

[73] Assignee: General Motors Corporation, Detroit, Mich.

[21] Appl. No.: 508,005

[22] Filed: Jun. 27, 1983

[51] Int. Cl.³ .............................................. B60S 1/04
[52] U.S. Cl. ............................... 15/250.19; 15/250.16
[58] Field of Search ........... 15/250.16, 250.17, 250.19, 15/250.34

[56] References Cited

U.S. PATENT DOCUMENTS

| | | | |
|---|---|---|---|
| 2,284,844 | 6/1942 | Rappl | 15/250.19 |
| 2,895,157 | 7/1959 | Kocourek | 15/250.19 |
| 3,314,195 | 4/1967 | Ziegler | 15/250.19 X |
| 3,421,174 | 1/1969 | Reese | 15/250.19 |
| 4,040,141 | 8/1977 | O'Steen | 15/250.19 |
| 4,095,308 | 6/1978 | Blaiklock et al. | 15/250.19 X |

Primary Examiner—Harvey C. Hornsby
Assistant Examiner—Christine A. Peterson
Attorney, Agent, or Firm—Saul Schwartz

[57] ABSTRACT

A windshield wiper system having a wiper blade movable across the windshield through a wiping arc and through a parking arc to a depressed park position below the lower edge of the windshield, a pair of guide links on the body movable between extended and retracted positions in a plane forming an acute angle with the windshield, and a pair of cams on the wiper blade engageable on the guide links as the blade moves toward the depressed park position to lift the wiper blade off of the windshield, the torque of the wiper drive motor thereafter holding the wiper blade against the guide links as the latter move to their retracted positions so that the wiper blade is guided in the plane of the guide links to the depressed park position.

3 Claims, 5 Drawing Figures

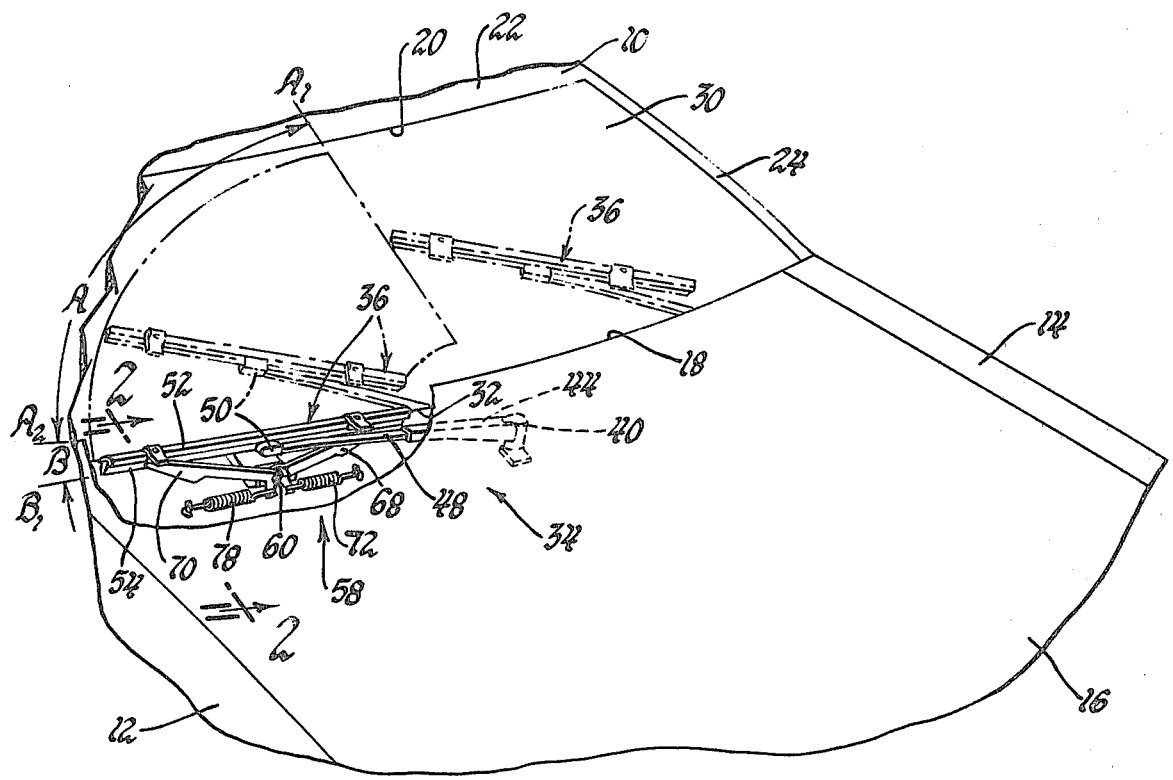

WINDSHIELD WIPER SYSTEM

BACKGROUND OF THE INVENTION

1. Field of the Invention

This invention relates generally to vehicle windshield wiper systems and, more particularly, to apparatus for guiding a wiper blade and arm assembly to a depressed park position.

2. Description of the Prior Art

In typical depressed park windshield wiper systems windshield wiper blade and arm assemblies are driven in wiping arcs across the windshield to maintain visibility and to depressed park or stowed positions below the wiping arcs when not in use. Usually, the windshield extends below the plane of the hood or other panel immediately ahead of the windshield and a gap is provided between the rear edge of the hood or other panel and the windshield through which the blade and arm assembly passes as it moves from the wiping arc toward the depressed park position where the wiper blade rests against the glass below the plane of the hood or other panel. Where the rearward rake or tilt of the windshield is only moderate, the gap between the hood and the windshield can be made acceptably narrow from an overall appearance standpoint and, where the glass extends below the plane of the hood, the wiper blades are always in contact with the smooth glass surface. However, as the rearward rake of the windshield becomes more pronounced, the width of the gap necessary to allow unobstructed passage of the blade and arm assembly becomes aesthetically objectionable. In addition, where the glass does not extend appreciably below the plane of the hood or other panel, movement of the blade and arm assembly to and from the depressed park psotion is most advantageously effected without interference between the wiper blade and the edge of the windshield. A windshield wiper system according to this invention incorporates apparatus whereby a relatively narrow gap between the glass and the rear edge of the hood or other panel is maintained even with a windshield of relatively pronounced rearward rake and whereby the wiper blade is guided around the lower edge of the glass during movement of the blade and arm assembly into or out of a depressed park position.

SUMMARY OF THE INVENTION

Accordingly, the primary feature of this invention is that it provides a new and improved windshield wiper system wherein a narrow gap is maintained for passage of a wiper blade and arm assembly between a windshield having pronounced rearward rake and the rear edge of a hood or other body panel. Another feature of this invention resides in the provision in the new and improved windshield wiper system of apparatus for guiding the wiper blade around the lower edge of the windshield upon movement of the wiper blade and arm assembly to and from a depressed park position below the normal wiping arc and below the lower edge of the windshield. Still another feature of this invention resides in the provision in the new and improved windshield wiper system of apparatus whereby the wiper blade and arm assembly is guided to the depressed park position in a plane of motion defining an acute angle with the windshield thereby to foreshorten the gap between the windshield and the rear edge of the hood or other panel required to permit passage of the blade and arm assembly to the depressed park position. And a still further feature of this invention resides in the provision in the new and improved windshield wiper system of a pair of guide links pivoted on the vehicle body below the lower edge of the windshield in scissors-like fashion and spring biased to extended positions wherein distal ends of the links project above the plane of the windshield and, in addition, in the provision of cams on the windshield wiper blade and arm assembly which engage respective distal ends of the links as the blade and arm assembly moves toward the depressed park position to guide the wiper blade around the lower edge of the windshield continued movement of the blade and arm assembly toward the depressed park position providing sufficient torque to overcome the springs biasing the links to the extended positions so that the links pivot from the extended to respective retracted positions during which movement the blade and arm assembly is guided in the plane of the links to the depressed park position. These and other features of this invention will be readily apparent from the following specification and from the drawings wherein:

FIG. 1 is a partially broken away perspective view of the forward portion of a vehicle body having a windshield wiper system according to this invention;

FIG. 2 is an enlarged sectional view taken generally along the plane indicated by lines 2—2 in FIG. 1;

Figure 3:
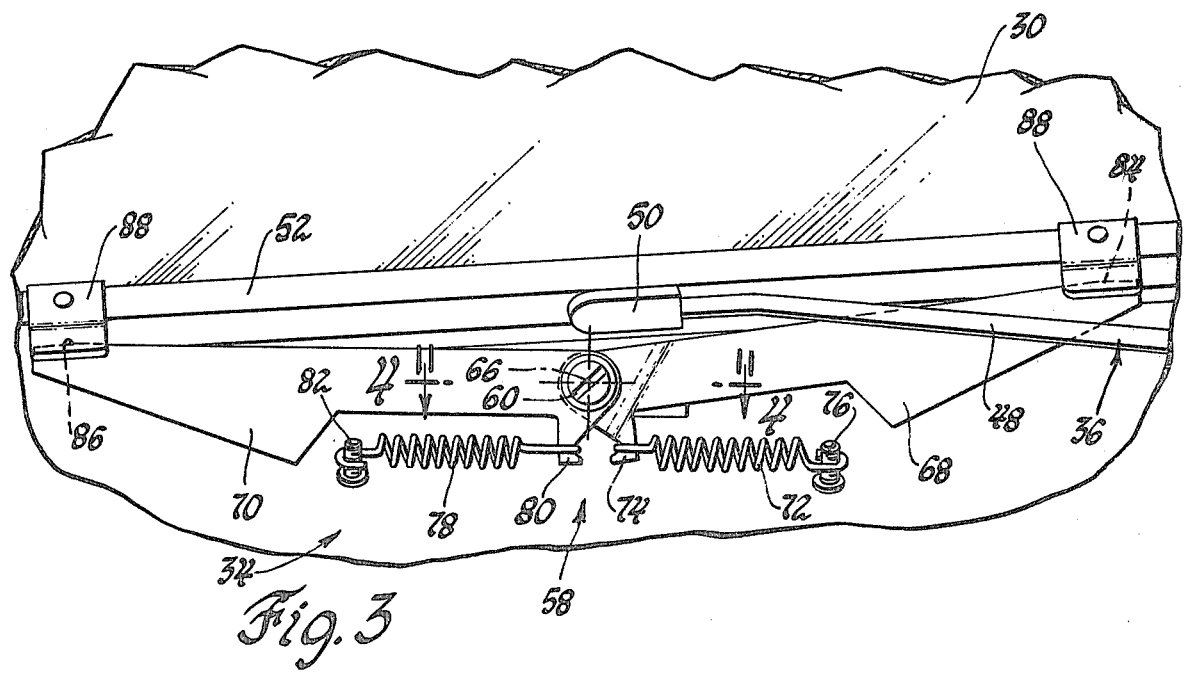
FIG. 3 is a view taken generally along the plane indicated by lines 3—3 in FIG. 2.
Figure 4:
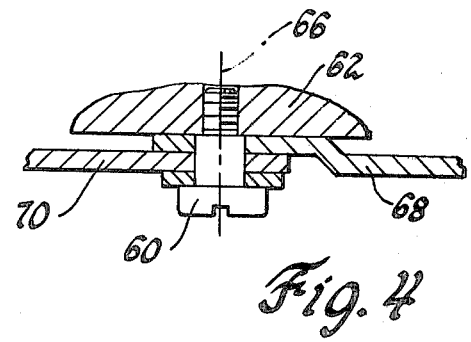
FIG. 4 is a sectional view taken generally along the plane indicated by lines 4—4 in FIG. 3.

Referring now to FIG. 1 of the drawings, an automobile body 10 has a pair of laterally spaced front fenders 12 and 14 flanking a hood 16 having a transversely extending rear edge 18. The rear edge 18 of the hood is also representative of the rear edge of any transverse panel of the body which may be provided between a hood and the windshield. A front windshield opening 20 of the body is defined at the top by a roof panel 22, at one side by a pillar 24, at the other side by a similar pillar, not shown, and at the bottom by a transversely extending flanged extension 26 of a cowl panel 28 disposed below the plane of the hood 16, FIG. 2. A glass panel or windshield 30 is mounted in the windshield opening 20 by conventional means, not shown, and includes a transversely extending lower margin or edge 32 located below and rearward of the rear edge 18 of the hood 16. As seen best in FIG. 2, the windshield 30 has a pronounced rearward rake or tilt characteristic of advanced aerodynamic body designs. For maintaining visibility during periods of inclement weather the body 10 is equipped with a windshield wiper system according to this invention and designated generally 34.

While the windshield wiper system 34 includes a pair of generally identical wiper blade and arm assemblies 35, adequate understanding of the system requires that only the left or passenger side assembly be described hereinafter. As seen best in FIGS. 1 and 2, the passenger side blade and arm assembly 36 includes a transmission 38 rigidly attached to the cowl panel 38 near the longitudinal centerline of the body. The transmission rotatably supports a pivot shaft, not shown, connected below the cowl panel 28 to a wiper drive system whereby the pivot shaft is angularly oscillated in known fashion. Outboard of the cowl panel 28 the pivot shaft has rigidly secured thereto a hub 40 of the windshield wiper blade and arm assembly 36. The blade and arm assembly further includes a base 44 supported on the hub 40 for pivotal movement about an axis 46 disposed in a plane generally perpendicular to the pivot shaft. An extension 48 is mounted on the base 44 for unitary pivotal movement with the latter and the hub 40 but is axially adjustable in known fashion. A connector 50 disposed at the distal end of extension 48 connects the extension to a blade support 52 having a channel cross section, FIG. 2. Housed within the blade support 52 and extending generally the entire length thereof is a conventional wiper blade 54 of rubber or like material having a wiping edge 56 for squeegeeing moisture from the windshield 30. A spring, not shown, between the base 44 and the hub 40 biases the base, the extension 48, and the blade support 52 in a counterclockwise direction, FIG. 2, about axis 46 thereby urging the wiping edge 56 to engagement on the windshield. In known fashion the wiper drive pivots the blade and arm assembly 36 through a wiping arc A bounded by an upper limit $A_1$, and a lower limit $A_2$ and through a parking arc B below the wiping arc from the limit $A_2$ to a depressed park position indicated at $B_1$. A guide arrangement 58 is provided to guide the blade and arm assembly to the depressed park position.

As seen best in FIGS. 2 through 5, the guide arrangement 58 includes a pin 60 threaded into a support 62 rigidly attached to the cowl panel 28 in a transversely extending recess 64 of the latter, FIG. 2. The pin 60 defines an axis 66 of the cowl panel and supports for rotation in scissors-like fashion about the axis a first guide link 68 and a second guide link 70. A first spring 72 has one end hooked over a tang 74 of the first guide link 68 and the other end hooked over a post 76 rigidly attached to the cowl panel 28. Similarly, a second spring 78 has one end hooked over a tang 80 of the second guide link 70 and the other end hooked over a post 82 rigidly attached to the cowl panel 28. The first and second guide links 68 and 70 pivot in a common plane P, FIG. 2, perpendicular to the axis 66 which plane defines an acute angle C with the plane of the windshield 30 in the area of pin 60. The springs 72 and 78 bias the guide links 68 and 70, respectively, in opposite directions to extended positions, FIG. 5, defined by appropriate fixed stops, not shown. In the extended position of the guide link 68 a guide edge 84 formed at the distal end thereof is disposed above or outboard of the plane of windshield 30. Similarly, in extended position of guide link 70 a guide edge 86 formed on the distal end thereof is disposed above or outboard of the plane of the windshield 30.

Figure 5:
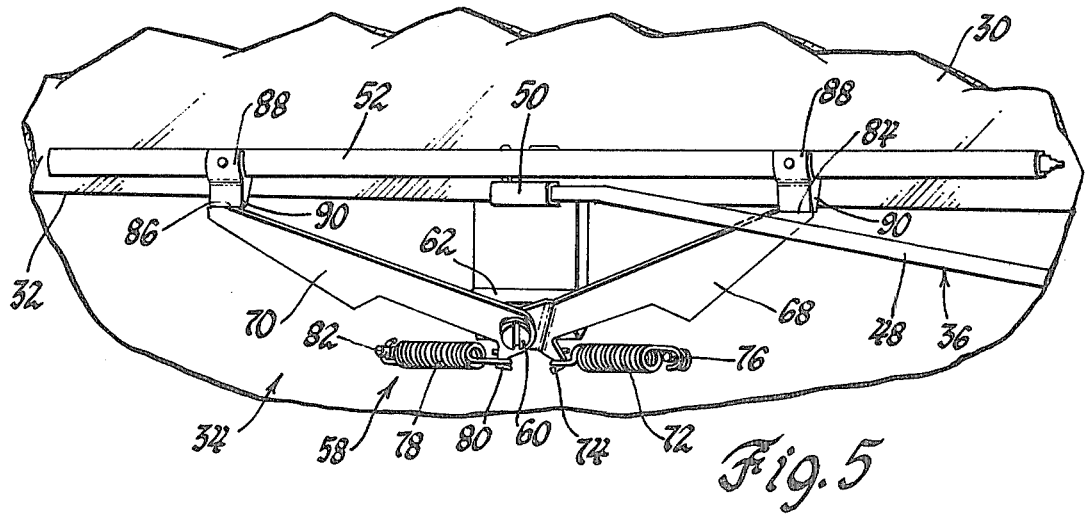
FIG. 5 is a view similar to FIG. 3 but showing the guide links in extended positions.

As seen best in FIGS. 2, 3 and 5, a pair of cams 88 having lifting edges 90 are rigidly attached to the blade support 52 in spaced relationship corresponding to the lateral spacing between the guide edges 84 and 86 in the extended positions of the guide links 68 and 70, respectively. As described hereinafter, the lifting edges 90 are adapted to engage the guide edges 84 and 86 so that the blade support 52 and blade 54 are lifted off of the windshield 30 as the lifting edges pass over the guide edges.

Describing, now, the operation of the windshield wiper system 34 commencing with the system in normal operation, the wiper drive oscillates the pivot shaft on which the hub 40 is supported thereby causing the blade and arm assembly 36 to oscillate through the arc A, FIG. 1, across the surface of the windshield 30. The spring between the base 44 and the hub 40 urges the wiping edge 56 into engagement on the glass to squeegee water off of the window in conventional fashion. Actuation of a conventional control terminates wiping by cycling the blade and arm assembly 36 through a final wipe from position $A_1$ to position $A_2$ and then from position $A_2$ into the arc B toward the depressed park position $B_1$. As the blade support 52 moves into the arc B each of the lifting edges 90 engages the corresponding one of the guide edges 84 and 86 on the guide links 68 and 70, respectively, held in the extended positions by springs 72 and 78. The springs 72 and 78 are stronger than the spring urging the wiping edge 56 against the windshield so that as the blade support 52 progresses further into the arc B the lifting edges 90 ride up and over the guide edges 84 and 86 thereby lifting the blade support 52, the wiper blade 54 and the wiping edge 56 away from or above the windshield 30.

As the blade and arm assembly 36 continues in the arc B toward depressed park position $B_1$, the lifting edges 90 ride over the guide edges 84 and 86 until an intermediate position 36', FIG. 2, is achieved wherein the guide edges engage the side of blade support 52 at the intersection of the latter and lifting edges 90. The guide links 68 and 70 thus prevent further movement of the blade support 52 parallel to the plane of the windshield from the intermediate position. Rather, the torque being applied to the blade and arm assembly 36 resolves itself into resultant forces including components in plane P operative to pivot the guide links 68 and 70 in opposite directions from the extended positions to retracted positions, FIGS. 1, 2 and 3, defined by appropriate fixed stops, not shown, wherein the guide surfaces are disposed below the windshield 30 and below the lower edge 32 of the latter. As the guide links pivot to their retracted positions the torque on the pivot shaft of the blade and arm assembly maintains intimate contact between the side of the blade support 52 and the guide edges 84 and 86 at the intersection of the blade support and the lifting edges 90 so that the blade support descends in the plane P defined by the guide links from the intermediate position 36' to the depressed park position illustrated in FIGS. 1, 2 and 3.

Because the path of motion of the blade support 52 from the intermediate position 36' of the blade and arm assembly 36 lies in the plane P at acute angle C relative to the plane of the windshield, the gap between the lower edge 32 of the windshield and the rear edge 18 of the hood need only be wide enough to accommodate the projection of the blade support 52 and wiper blade 54 on a plane perpendicular to plane P. This projection obviously decreases in width as acute angle C increases in magnitude and increases in width as acute angle C decreases in magnitude. Accordingly, the width of the gap is less than would otherwise be necessary if the blade and arm assembly 36 were to continue on in the plane of the windshield toward the depressed park position. The windshield wiper drive continues to apply torque to the pivot shaft until the guide links 68 and 70 achieve their retracted positions whereupon the wiper drive is deenergized. Because of the substantial gear reduction between the wiper drive motor armature and the pivot shaft, the springs 72 and 78 cannot back drive the wiper drive motor through the guide links 68 and 70. Accordingly, the wiper blade and arm assembly 36 is maintained in the depressed park position with the guide links 68 and 70 held in their retracted positions.

To initiate a subsequent operational cycle, the wiper drive motor is energized and applies torque to the pivot shaft to pivot the blade and arm assembly 36 clockwise, FIG. 1, from the depressed park position B₁ through the arc B to the wiping arc A. The result is that the forces on the guide links 68 and 70 holding them in their retracted positions decreases so that the guide links pivot from their retracted to their extended positions simultaneously with movement of the wiper arm assembly toward the wiping arc A. The speed of movement of the blade and arm assembly 36 toward the wiping arc is predetermined to avoid separation between the blade support 52 and the guide edges 84 and 86 so that the blade support is guided by the guide links 68 and 70 in the plane P from the depressed park position back to the intermediate position 36 during which movement the wiping edge 56 is guided from below the lower edge 32 of the windshield to a position above the windshield without brushing against or otherwise interfering with the lower edge of the windshield. When the guide links 68 and 70 achieve their extended positions, continued movement of the blade and arm assembly 36 in the counterclockwise direction toward the position A₁ causes the lifting edges 90 on the cams 88 to traverse the guide edges in the opposite directions thereby lowering the wiping edge 56 to the surface of the windshield so that continued movement of the blade and arm assembly through the arc A causes normal wiping action as described hereinbefore.

The embodiments of the invention in which an exclusive property or privilege is claimed are defined as follows:

1. On a vehicle body including a windshield having a lower edge, wiper means on said body including blade means movable generally perpendicular to said windshield and parallel thereto in a first arc to wipe said windshield and in a second arc to a depressed park position below said lower edge, and spring means biasing said blade means against said windshield, the combination comprising, guide means on said body, means on said body defining a motion path for said guide means in a plane forming an acute angle with said windshield for movement of said guide means between an extended position outboard of said windshield and a retracted position below said lower edge, cam means between said guide means and said blade means operative upon movement of said blade means into said second arc toward said depressed park position with said guide means in said extended position to lift said blade means off of said windshield, and means operative to thereafter hold said blade means against said guide means as said blade means moves to said depressed park position so that said blade means is guided by said guide means in said plane to said depressed park position when said guide means achieves said retracted position.

2. On a vehicle body including a windshield having a lower edge, wiper means on said body including blade means movable generally perpendicular to said windshield and parallel thereto in a first arc to wipe said windshield and in a second arc to a depressed park position below said lower edge, and spring means biasing said blade means against said windshield, the combination comprising, a pair of guide links disposed on said body for pivotal movement about a common axis of said body in a plane forming an acute angle with said windshield in opposite directions from extended positions to retracted positions, means on each of said guide links defining a guide edge, each of said guide edges being disposed outboard of said windshield in said extended positions of said guide links and below said lower edge in said retracted positions of said guide links, means on said blade means defining a pair of cams engageable on corresponding ones of said guide edges in said extended positions of said guide links when said blade means moves into said second arc and operative to lift said blade means off of said windshield, and means operative to thereafter hold said blade means against corresponding ones of said guide edges as said blade means moves to said depressed park position so that said blade means is guided by said guide links in said plane to said depressed park position when said guide links achieve said retracted positions.

3. On a vehicle body including a windshield having a lower edge, blade means on said body movable generally perpendicular to said windshield and parallel thereto in a first arc to wipe said windshield and in a second arc to a depressed park position below said lower edge, drive means connected to said blade means and operative to apply torque to the latter for moving said blade means in said second arc toward and away from said depressed park position, and spring means biasing said blade means against said windshield, the combination comprising, a pair of guide links disposed on said body for pivotal movement about a common axis of said body in a plane forming an acute angle with said windshield in opposite directions from extended positions to retracted positions, means on each of said guide links defining a guide edge, each of said guide edges being disposed outboard of said windshield in said extended positions of said guide links and below said lower edge in said retracted positions of guide links, spring means biasing said guide links to said extended positions, means on said blade means defining a pair of cams engageable on corresponding ones of said guide edges in said extended positions of said guide links when said blade means moves into said second arc and operative to lift said blade means off of said windshield, and means on said blade means and on said cams operable to limit movement of said blade means in said second arc toward said depressed park position parallel to said windshield, said drive means thereafter applying sufficient torque to said blade means to hold said blade means against said guide edges and to pivot said guide links against said spring means from said extended to said retracted positions as said blade means moves to said depressed park position so that said blade means is guided by said guide links in said plane to said depressed park position when said guide llinks achieve said retracted positions.

* * * * *